US012565945B2

(12) United States Patent
Moceri et al.

(10) Patent No.: US 12,565,945 B2
(45) Date of Patent: Mar. 3, 2026

(54) MANIPULATOR DEVICE TO APPLY MODULES AROUND A PIPELINE, LAYING VESSEL COMPRISING SAID DEVICE AND METHOD TO OPERATE SAID LAYING VESSEL

(71) Applicant: SAIPEM S.P.A., Milan (IT)

(72) Inventors: Liborio Moceri, Milan (IT); Carlo Chiodini, Milan (IT); Luca Arnesano, Milan (IT); Emmanuel Huot, Milan (IT)

(73) Assignee: SAIPEM S.P.A., Milan (IT)

( * ) Notice: Subject to any disclaimer, the term of this patent is extended or adjusted under 35 U.S.C. 154(b) by 193 days.

(21) Appl. No.: 18/029,000

(22) PCT Filed: Oct. 1, 2021

(86) PCT No.: PCT/IB2021/059052
§ 371 (c)(1),
(2) Date: Mar. 28, 2023

(87) PCT Pub. No.: WO2022/070160
PCT Pub. Date: Apr. 7, 2022

(65) Prior Publication Data
US 2024/0035591 A1 Feb. 1, 2024

(30) Foreign Application Priority Data

Oct. 1, 2020 (IT) ........................ 102020000023206

(51) Int. Cl.
*F16L 1/20* (2006.01)
*B63B 35/03* (2006.01)
(Continued)

(52) U.S. Cl.
CPC .............. *F16L 1/207* (2013.01); *B63B 35/03* (2013.01); *B66C 1/68* (2013.01); *F16L 1/26* (2013.01)

(58) Field of Classification Search
CPC ..... F16L 1/207; F16L 1/26; F16L 1/12; B63B 35/03
See application file for complete search history.

(56) References Cited

U.S. PATENT DOCUMENTS 6,592,297 B2 * 7/2003 Frijns ...................... F16L 1/207
405/169
2002/0021943 A1 * 2/2002 Frijns ................. B23K 37/0533
405/166
(Continued)

FOREIGN PATENT DOCUMENTS

CN 205982478 * 2/2017
EP 2462369 6/2012
(Continued)

OTHER PUBLICATIONS

Notification Concerning Submission, Obtention or Transmittal of Priority Document for International Application No. PCT/IB2021/059052 dated Jan. 5, 2022.
(Continued)

*Primary Examiner* — Sean D Andrish
(74) *Attorney, Agent, or Firm* — Neal, Gerber & Eisenberg LLP

(57) ABSTRACT

A manipulator device to apply modules around a pipeline during assembly has two jaws mobile between an open and a closed position and configured to house the respective portions of the module, and an articulated mechanism having a plurality of degrees of freedom to place the jaws in a loading position and in a position wherein the jaws are aligned with the pipeline during assembly.

22 Claims, 9 Drawing Sheets

(51) Int. Cl.
 *B66C 1/68* (2006.01)
 *F16L 1/26* (2006.01)

(56) References Cited

U.S. PATENT DOCUMENTS

| | | | |
|---|---|---|---|
| 2009/0252559 A1 | 10/2009 | Masters et al. | |
| 2010/0104370 A1* | 4/2010 | van Egmond | F16L 1/207 |
| | | | 405/154.1 |
| 2014/0161535 A1* | 6/2014 | Machado Guigon De Araujo | |
| | | | F16L 1/19 |
| | | | 405/168.4 |
| 2018/0148147 A1 | 5/2018 | Wigant | |

FOREIGN PATENT DOCUMENTS

| | | | |
|---|---|---|---|
| EP | 2732191 | | 5/2014 |
| WO | WO 01/07812 | | 2/2001 |
| WO | WO 2009/082191 | | 7/2009 |
| WO | WO 2009/145607 | | 12/2009 |
| WO | WO 2009/153352 | | 12/2009 |
| WO | WO 2018/117846 | * | 6/2018 |

OTHER PUBLICATIONS

International Search Report and Written Opinion for International Application No. PCT/IB2021/059052 dated Jan. 7, 2022.
Five Notifications of the Recording of a Change for International Application No. PCT/IB2021/059052.

\* cited by examiner

MANIPULATOR DEVICE TO APPLY MODULES AROUND A PIPELINE, LAYING VESSEL COMPRISING SAID DEVICE AND METHOD TO OPERATE SAID LAYING VESSEL

PRIORITY CLAIM

This application is a national stage application of PCT/IB2021/059052, filed on Oct. 1, 2021, which claims the benefit of and priority to Italian Patent Application No. 102020000023206 filed on Oct. 1, 2020, the entire contents of which are each incorporated by reference herein.

TECHNICAL FIELD

The present disclosure relates to a laying vessel for laying pipelines on a bed of a body of water.

In particular, the present disclosure relates to a laying vessel comprising a floating structure and a laying tower hinged to the floating structure and configured to assemble and lay a pipeline on the bed of the body of water.

BACKGROUND

Prior laying vessels are described in PCT Patent Application Numbers WO 2009/082191 A1; WO 2009/145607 A1; and WO 01/07812 A1.

Sometimes it is necessary to apply bulky elements, in particular thrust modules, around the pipeline during assembly before laying. By way of example, the thrust modules can be applied to a pipeline connecting a fixed structure laid on the seabed and an anchored floating structure, which moves around the mooring position. This type of pipeline is called riser, which, in a particular configuration, forms two catenaries interspersed with an arch supported by the thrust modules.

Other types of pipelines, such as spanned flowline or trunkline pipelines, also require the application of bulky elements around the pipeline, which can be thrust modules, sensors, actuators, heating elements or modules fitted with fins arranged in a helical pattern, the function of which is to reduce the vibrations induced on the pipeline by weather conditions, mainly currents.

PCT Patent Application No. WO 2009/153352 describes a pipe-laying vessel configured to bring to the laying line and to weld bulky elements on a pipeline and comprising a laying tower; a loading arm for lifting sections of pipe from the deck of the vessel up to a position aligned with the tower; and a support assembly for supporting a bulky element to be applied around the pipeline, wherein the support assembly comprises a frame which can be inclined between a first position for receiving the bulky element and a second inclined position in which it extends parallel to the tower, and actuation means for allowing the rotation of the tiltable frame between the first and second position.

At present, the application of bulky elements involves a step of clamping the bulky element around the pipeline by workers, who work in the relatively limited spaces of the laying tower and under relatively heavy loads.

Furthermore, with the system described in PCT Patent Application No. WO 2009/153352, the coverage of bulky elements around the pipeline is reduced, due to the arrangement of the bulky module loading station above the welding station of the pipeline sections. This arrangement prevents the entire length of the pipeline from being covered with the bulky elements applied around the pipeline, and the maximum length of the bulky elements is limited, as the bulky element loading station must be safely accessible to workers.

SUMMARY

One aim of the present disclosure is to realize a manipulator device which mitigates certain of the drawbacks of certain of the prior art, in a relatively simple way and without substantial alterations in the configuration of the laying tower.

According to the present disclosure, a manipulator device is realized in order to apply modules around a pipeline during assembly, wherein each module comprises two portions configured to enclose a section of pipeline; the manipulator device comprising two jaws mobile between an open and a closed position and configured to house the respective portions of the module, and an articulated mechanism having a plurality of degrees of freedom to place the jaws in a loading position and in a position wherein the jaws are aligned with the pipeline during assembly.

According to the present disclosure, it is possible to apply modules around the pipeline during assembly in an automated manner, making laying operations relatively faster and enhancing the relative safety of the workers involved in the laying operations.

In addition, the present disclosure enables the modules to be applied relatively seamlessly to the pipeline, so that the pipeline section can be completely coated relatively quickly. In particular, the mechanism comprises a base body; and an arm, which is hinged to the base body around a first rotation axis and is selectively mobile around the first rotation axis, to adjust the inclination of the arm so as to align the jaws with the pipeline section to which the modules are to be applied.

In particular, the mechanism comprises a slide, which is coupled to the arm and the jaws and is configured to selectively move the jaws with respect to the arm in a first direction, so as to precisely adjust the longitudinal position of the jaws with respect to the pipeline section to which the modules are to be applied.

In particular, the mechanism comprises a first elongated body, which extends along a first longitudinal axis substantially parallel to the first direction, is coupled to the slide and moveably supports the two jaws between an open and a closed position.

According to the first elongated body, the jaws can be placed in the desired position. In particular, the mechanism comprises an adjusting device, which is configured to adjust the inclination of the jaws around a second rotation axis substantially parallel to the first rotation axis when the jaws are in proximity to the pipeline section. In this way, it is possible to precisely copy the inclination of the pipeline section to which the module is to be applied, following the movement of the floating structure and the oscillations of the laying tower.

In particular, each jaw comprises a frame, which is hinged to the first elongated body around a rotation axis substantially parallel to the first longitudinal axis, so as to allow or enable the respective jaw to be opened and closed.

In greater detail, the frame comprises a second elongated body, which extends along a second longitudinal axis substantially parallel to the first longitudinal axis; and two transverse elements, which are fixed to the second elongated body at a distance from each other and are configured to accommodate respective portions of the module. In this way, the second elongated body and the transverse elements delimit a housing seat for the portions of module.

In particular, each jaw comprises at least one preloading cylinder, which is coupled to the respective second elongated body and is configured to push the respective portion of module against the pipeline section when the jaws are in closed position around the pipeline section, so as to cause a radial preload on the portions of module.

In particular, each jaw comprises respective gripping belts, which are configured to accommodate and selectively hold respective portions of module.

According to the gripping belts, it is possible to hold the portions of module on the respective jaws when placing the jaws around the pipeline during assembly, and to release the portions of module after they have been applied to the pipeline. In particular, each jaw comprises at least one automatic screwdriver, which is carried by the respective jaw and is configured to screw together two respective portions of module. In this way, the portions of module are screwed together in an automated manner, avoiding the use of labor for the operations.

A further aim of the present disclosure is to realize a laying vessel that mitigates certain of the drawbacks of certain the prior art, in a relatively simple manner and without substantial alterations in the configuration of the laying tower.

According to the present disclosure, a laying vessel for laying pipelines on a bed of a body of water is realized; the laying vessel comprising a floating structure; a laying tower, which is hinged to the floating structure around a third rotation axis, defines a laying line, and is configured to assemble and lay a pipeline on the bed of the body of water; and the manipulator device as previously described. In this way, it is possible to lay a pipeline on the bed of a body of water relatively simply, quickly and safely, as the workers responsible for the operations of applying the modules around the pipeline work outside the laying tower.

In particular, the laying tower comprises a clamping assembly, which is configured to clamp and advance the pipeline section and comprises a first clamping unit fixed to the laying tower and a second clamping unit, which is arranged in series with respect to the first clamping unit and is mobile along the laying line between a first position, at a first distance from the first clamping unit, and a second position, at a second distance from the first clamping unit, wherein the first distance is greater than the second distance; the manipulator device being configured to apply the modules around the pipeline section comprised between the first and second clamping unit. In this way, it is possible to apply the module to the pipeline section comprised between the two clamping units and subsequently lay the pipeline section to which the module has been applied.

In accordance with a particular embodiment of the present disclosure, the laying vessel comprises a lifting frame configured to support at least one portion of the module; and a crane, which is configured to lift the lifting frame and is equipped with an adjustable gripping tool, which is configured to adjust the position and/or the inclination of the lifting frame with respect to the manipulator device so as to place each portion of the module in the respective jaw when the jaws are in the loading position. In this way, the position and the inclination of the lifting frame with respect to the manipulator device can be adjusted to follow the movements of the laying vessel.

A further aim of the present disclosure is to realize a method to operate a laying vessel which mitigates certain of the drawbacks of certain of the prior art.

According to the present disclosure, a method to operate a laying vessel is realized; the laying vessel comprising a floating structure; a laying tower, which is hinged to the floating structure around a third rotation axis, defines a laying line, and is configured to assemble and lay a pipeline on the bed of a body of water; the method comprising the steps of placing two jaws in a loading position; accommodating each portion of a module in the respective jaw; placing the two jaws in a position wherein the jaws are aligned with the pipeline during assembly; and closing the two jaws around a section of the pipeline. According to this method, it is possible to apply modules around the pipeline during assembly in an automated, relatively simple and relatively fast manner, avoiding the presence of workers involved in the operations of applying the modules in the laying tower. In this way, it is possible to increase the efficiency of pipeline-laying operations and, at the same time, to increase the level of relative safety for the workers involved in the laying operations.

BRIEF DESCRIPTION OF THE DRAWINGS

Further characteristics and advantages of the present disclosure will become clear from the following description of a non-limiting example of an embodiment thereof, with reference to the Figures of the attached drawings, in which.

DETAILED DESCRIPTION

Figures 1, 2:
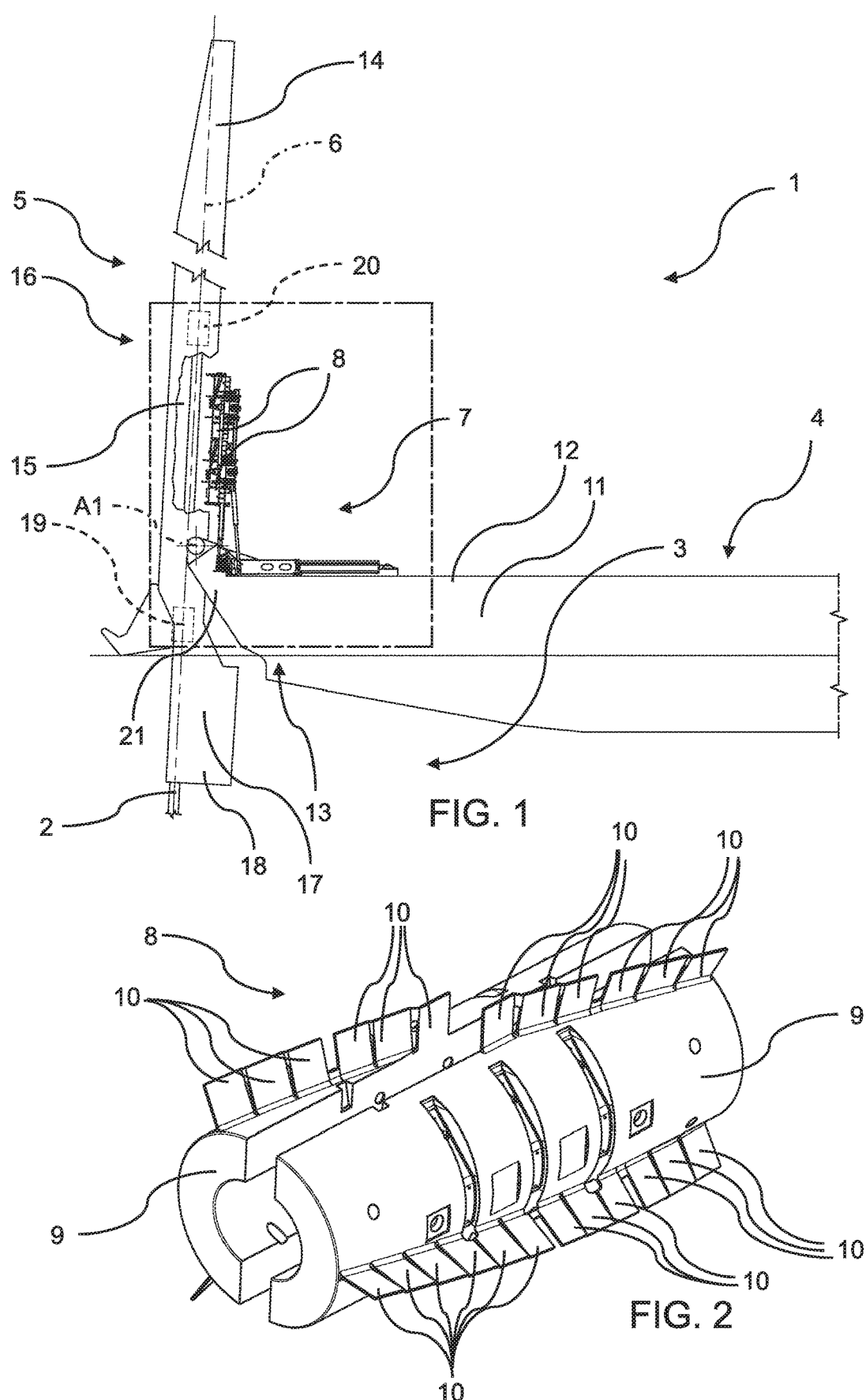
FIG. 1 is a side elevation view, with schematic parts and parts removed for clarity's sake, of a laying vessel realized in accordance with the present disclosure.
FIG. 2 is a perspective view of a thrust module applicable to a pipeline by the laying vessel of FIG. 1.
Figure 3:
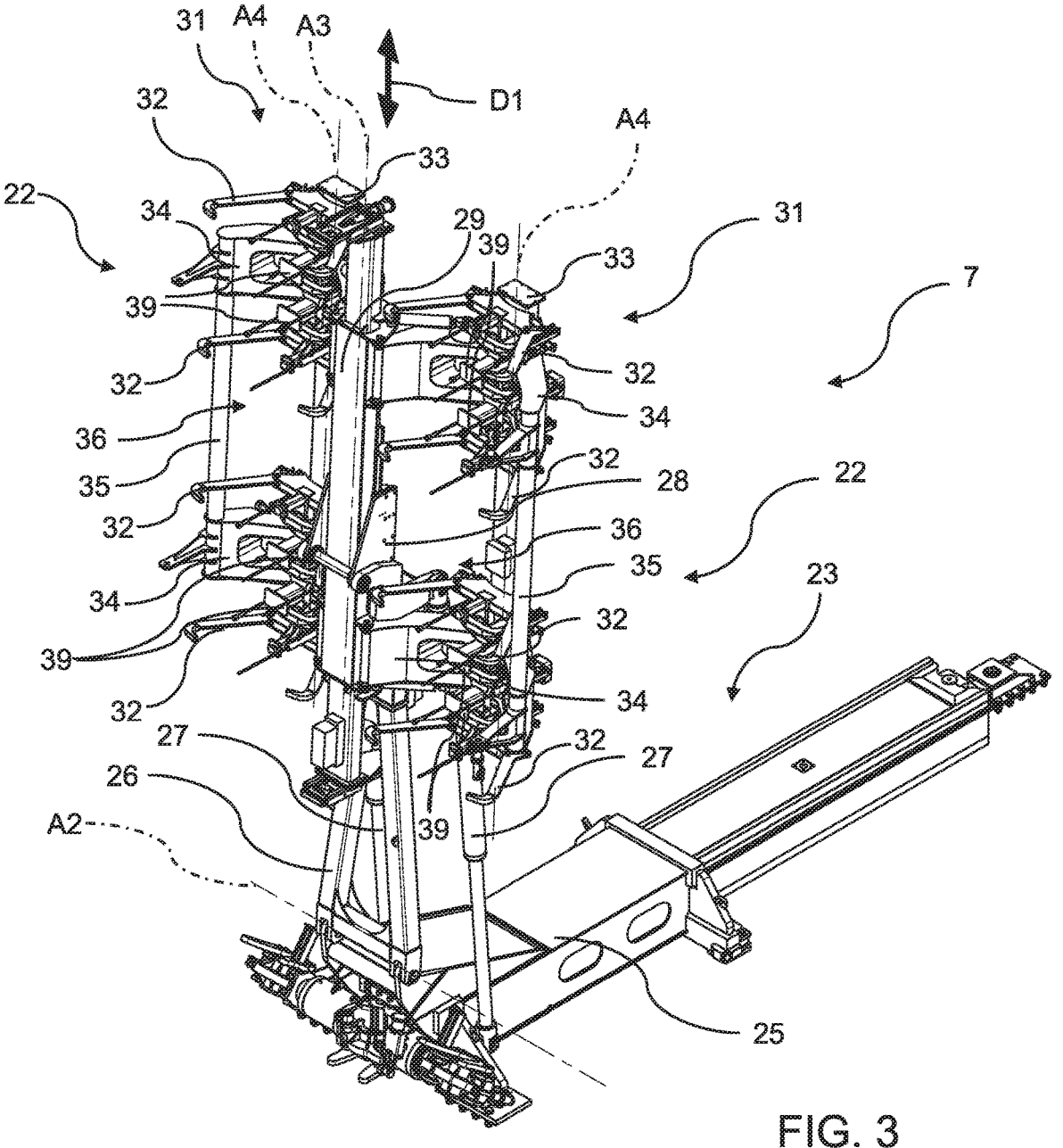
FIGS. 3 and 4 are perspective views of a manipulator device of the laying vessel of FIG. 1 in respective operating configurations.
Figure 4:
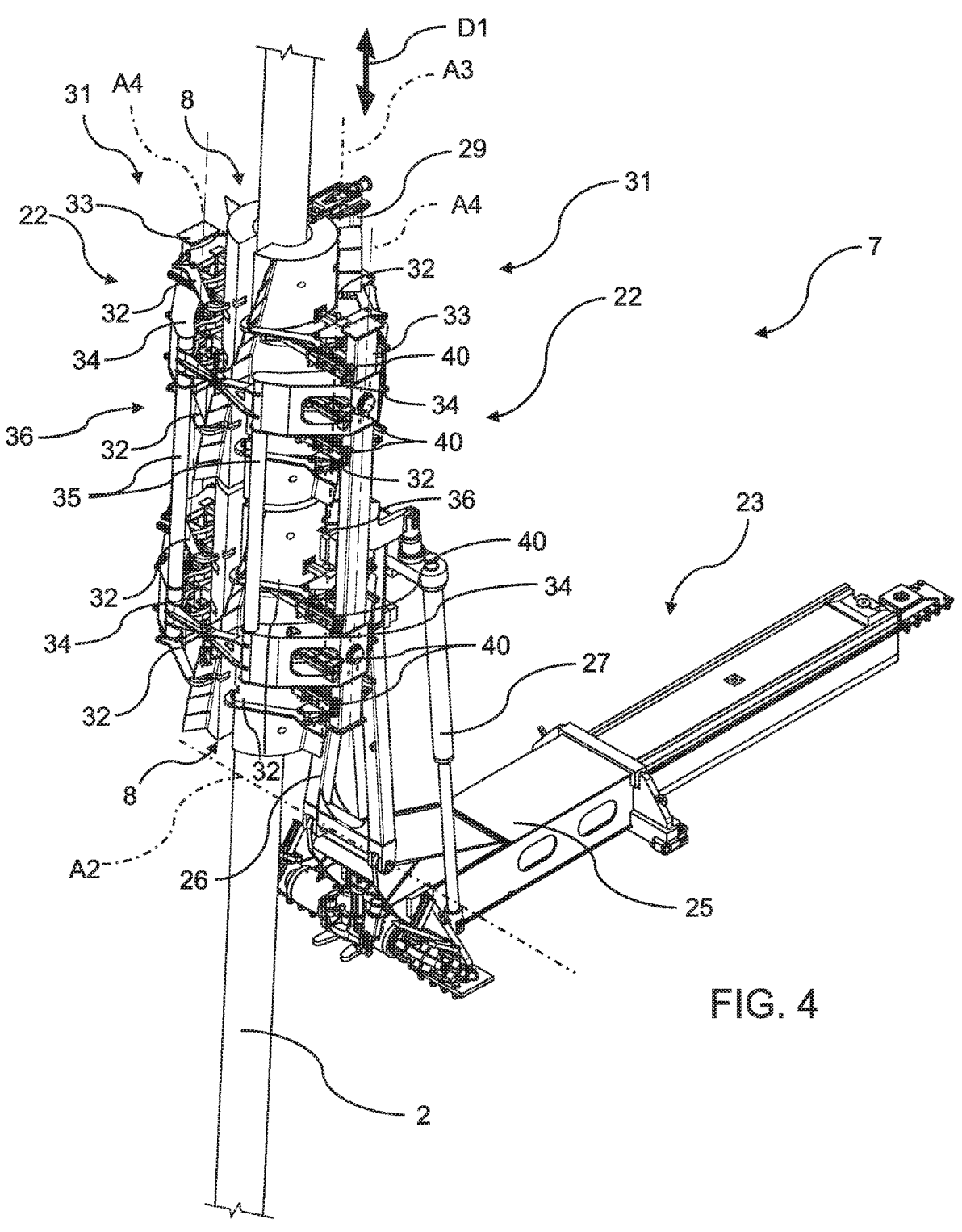
Figure 5:
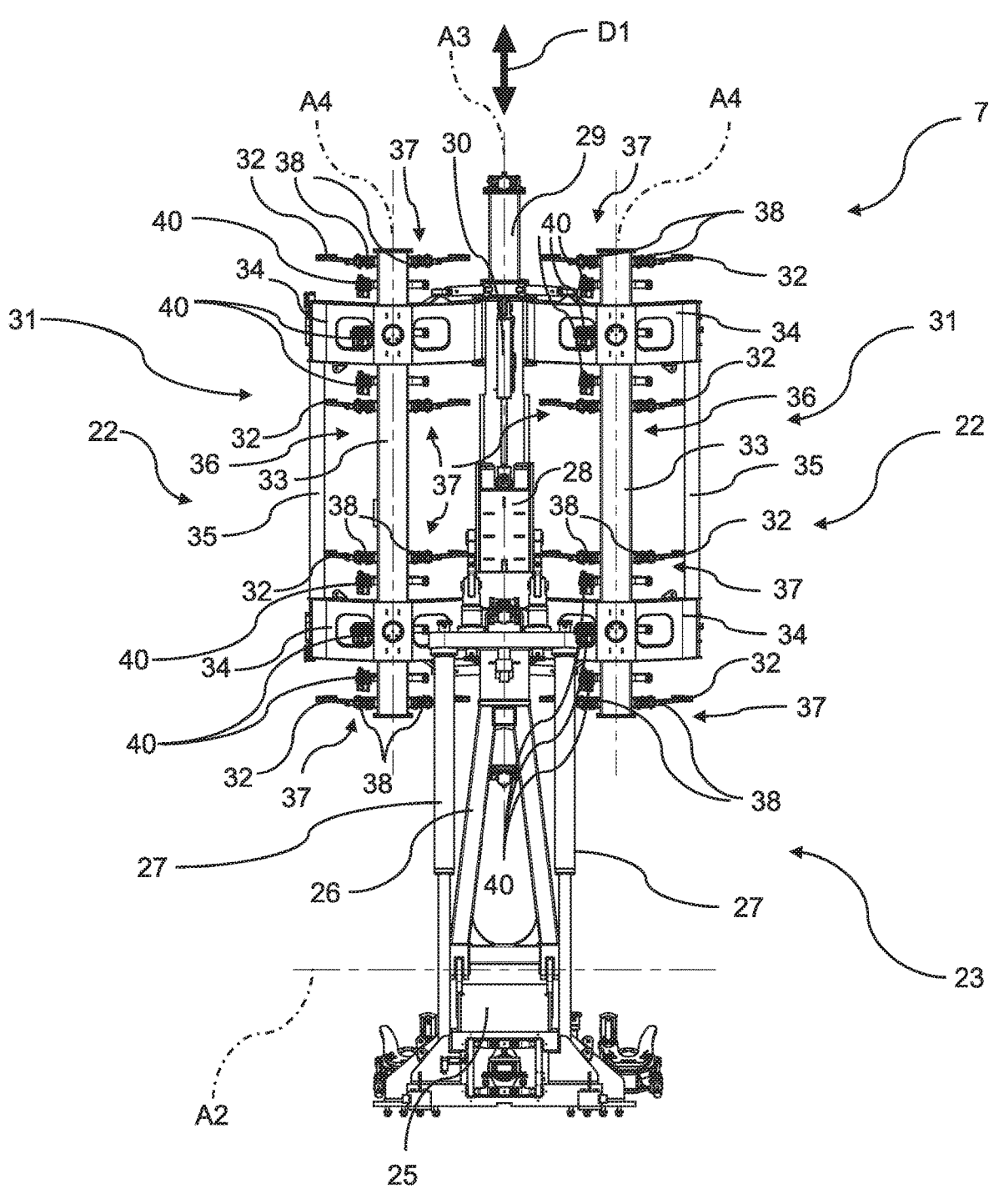
FIG. 5 is a front view of the manipulator device of the laying vessel of FIG. 1.

With reference to FIG. 1, number 1 overall denotes a laying vessel for laying a pipeline 2 on a bed (not shown in the drawings) of a body of water 3.

The laying vessel 1 comprises a floating structure 4; a laying tower 5, which defines a laying line 6 and is configured to assemble and lay the pipeline 2 on the bed of the body of water 3; and a manipulator device 7 to apply modules 8 to the pipeline 2 during assembly.

With reference to FIG. 2, the modules 8 comprise two hollow semi-cylindrical portions 9 that can be coupled together and are configured to determine an upward hydrostatic thrust on the pipeline 2. In this regard, each portion 9 may be made by roto-moulding and the hollow volume of each portion 9 may be filled with lightening material, for example syntactic spheres, special resins or foams, adapted to ensure an adequate upward hydrostatic thrust and to withstand the operating pressures in the body of water 3.

Furthermore, in the case described and shown herein, which is not limiting to the present disclosure, the modules 8 are configured to prevent wake vortices from detaching from the pipeline 2 when the pipeline 2 is arranged in the body of water 3. This vortex detachment phenomenon is caused by a water current incident to the pipeline 2, and can cause oscillations of the pipeline 2 induced by said vortices (Vortex Induced Vibration). When the detachment frequency of the vortexes (Vortex Shedding) that are generated at the rear of the pipeline 2 with respect to the direction of the current is close to a natural frequency of the pipeline 2, the induced oscillations are amplified, stressing the structure of the pipeline 2 with fatigue.

To mitigate certain of these drawbacks, in the case described and shown herein, each module 8 is equipped with hydrodynamic fins 10, which are arranged in a helical profile on the outer cylindrical face of the respective module 8. The hydrodynamic fins 10 reduce the phenomenon of detachment of the alternating vortexes based on a vorticity imposed on the water current by appropriate pitch and diameter ratios of the helical profile.

With reference to FIG. 1, the floating structure 4 has a hull 11, an open deck 12; a stern 13; and a bow (not shown in the drawings).

In the case described and shown herein, the laying tower 5 is mounted at the stern 13 and is hinged around a rotation axis A1 to selectively arrange the laying tower 5 between a plurality of operating positions, having respective inclinations with respect to the open deck 12. In this way, the laying tower 5 can assume a certain inclination to implement a J-laying type of the pipeline. In the J-laying type, the span of the pipeline 2 assumes a J shape, due to the single curvature of said span, and extends mainly in the vertical direction. J-laying uses a substantially vertical laying line 6, included within the laying tower 5.

According to another variant (not shown in the drawings), the laying tower 5 is mounted on the bow. According to another variant (not shown in the drawings), the laying tower 5 is mounted on a balcony along one of the sides of the floating structure 4.

The laying tower 5 has an upper portion 14 equipped with devices (not shown) to assemble pipe segments (not shown) to realize the pipeline 2 as the pipeline 2 is laid; a central portion 15 equipped with a clamping assembly 16 configured to clamp and advance the pipeline 2 during assembly; and a lower portion 17 comprising a laying ramp 18.

The clamping assembly 16 comprises a clamping unit 19 fixed to the laying tower 5 and a clamping unit 20, which is arranged in series with respect to the clamping unit 19 and is mobile along the laying line 6 between a first position, at a first distance from the clamping unit 19, and a second position, at a second distance from the clamping unit 19, wherein the first distance is greater than the second distance. In other words, the clamping unit 20 is mobile parallel to the laying line 6 so that by alternately gripping the two clamping units 19 and 20 it is possible to advance the pipeline 2 along the laying tower 5.

Furthermore, the floating structure 4 comprises two parallel arms 21 (only one of which is shown in FIG. 1) that extend above the open deck 12 and rotatably support the laying tower 5. In this way, the rotation axis A1 of the laying tower 5 is arranged above the open deck 12 at the ends of the arms 21.

In the case described and shown herein, the manipulator device 7 is arranged on the open deck 12 at the laying tower 5, is mobile with respect to the laying tower 5, and is configured to apply the modules 8 around the pipeline 2 section comprised between the clamping units 19 and 20.

With reference to FIGS. 3 to 6, the manipulator device 7 comprises two jaws 22, which are mobile between an open and a closed position and are configured to house respective portions 9 of module 8; and an articulated mechanism 23, which has a plurality of degrees of freedom and is configured to place the jaws 22 in a loading position and in a position wherein they are aligned with the pipeline 2 during assembly.

The mechanism 23 comprises a base body 25, which is fixed to the open deck 12; an arm 26, which is hinged to the base body 25 around a rotation axis A2; two actuators 27, which are configured to actuate the rotation of the arm 26 around the rotation axis A2; and a slide 28, which is coupled to the arm 26 and the jaws 22 and is configured to selectively move the jaws 22 with respect to the arm 26 in a direction D1.

The mechanism 23 further comprises an elongated body 29, which extends along a longitudinal axis A3, is coupled to the slide 28 and supports the two jaws 22 in a mobile manner; and an actuator 30, which is coupled to the slide 28 and the elongated body 29 and is configured to actuate the movement of the jaws 22 in the direction D1. In particular, the jaws 22 extend on opposite sides with respect to the elongated body 29 and are moveably coupled to the elongated body 29 between an open and a closed position.

Each jaw 22 comprises a frame 31, which is hinged to the elongated body 29 around a rotation axis substantially parallel to the longitudinal axis A3, and respective gripping belts 32, which are supported by the frame 31 and are configured to accommodate and selectively hold respective portions 9 of module 8.

The frame 31 comprises an elongated body 33, which extends along a respective longitudinal axis A4 substantially parallel to the longitudinal axis A3; two transverse elements 34, which are fixed to the elongated body 33 at a distance from each other and are configured to accommodate respective portions 9 of module 8; and a side bar 35, which is fixed to the ends of the transverse elements 34 so as to delimit together with the transverse elements 34 a housing seat 36 for the portion 9 of module 8.

Although in the case described and shown herein, which is not limiting to the present disclosure, each of the housing seats 36 is configured to accommodate two portions 9 of module 8 arranged in series, each jaw 22 may be configured to accommodate a different number of portions 9 of module 8 in the respective housing seat 36. In particular, in accordance with a variation of the embodiment described and shown, each housing seat 36 may be configured to accommodate four portions 9 of module 8.

Each jaw 22 is equipped with four belts 32 arranged at a distance from each other along the longitudinal axis A4, and with clamping devices 37 (FIG. 6), each of which is actuated by respective actuators 38 (FIG. 5) and is configured to clamp the respective belt 32 around the portion 9 of module 8.

Each belt 32 is shaped to accommodate and hold a portion 9 of module 8 and in this case it extends along a given or designated arc of circumference.

Each jaw 22 further comprises at least one preloading cylinder 39 (FIG. 3), which is coupled to the respective elongated body 33 and is configured to push the respective portion 9 of module 8 against the pipeline 2 section when the jaws 22 are in closed position around the pipeline 2 section; and at least one automatic screwdriver 40 (FIGS. 4 and 5), which is carried by the respective transverse element 34 and is configured to screw together two respective portions 9 of module 8 with a set tightening torque.

Figure 6:
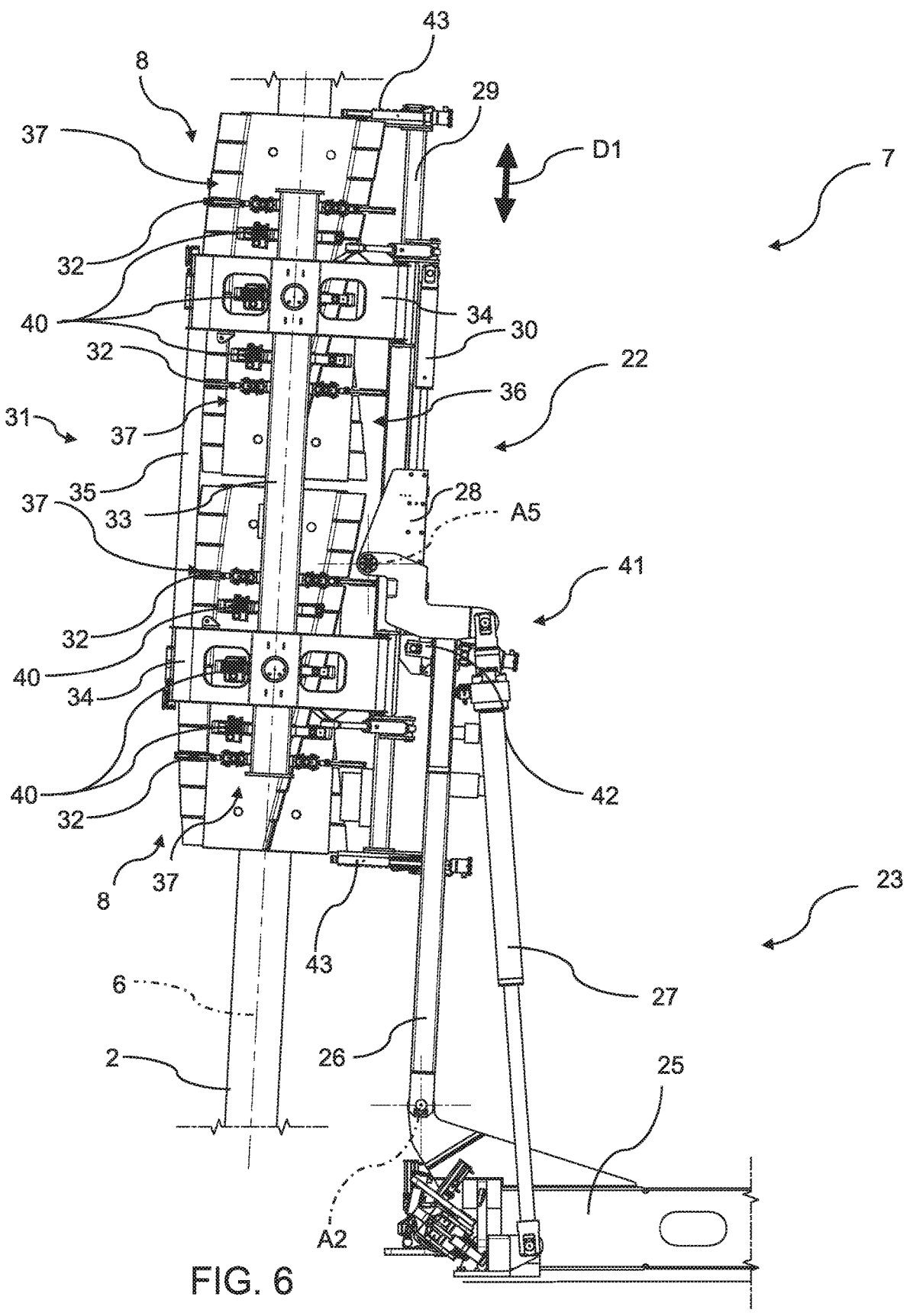
FIG. 6 is a side elevation view of the manipulator device of the laying vessel of FIG. 1.

With reference to FIG. 6, the mechanism 23 comprises an adjusting device 41, which is configured to adjust the inclination of the jaws 22 around a rotation axis A5 substantially parallel to the second rotation axis A2 when the jaws 22 are in proximity to the pipeline 2 section. In particular, the adjusting device 41 comprises an actuator 42, such as a hydraulic cylinder, which acts on the elongated body 29, causing the elongated body 29 and the jaws 22 supported by the elongated body 29 to rotate around the rotation axis A5.

In addition, the mechanism 23 comprises two contact sensors 43 fixed to opposite ends of the elongated body 29. Each contact sensor 43 is configured to emit a contact signal when in contact with the pipeline 2, providing the adjusting device 41 with a feedback to actuate the actuator 42 to precisely align the jaws 22 to the pipeline 2.

Figure 7:
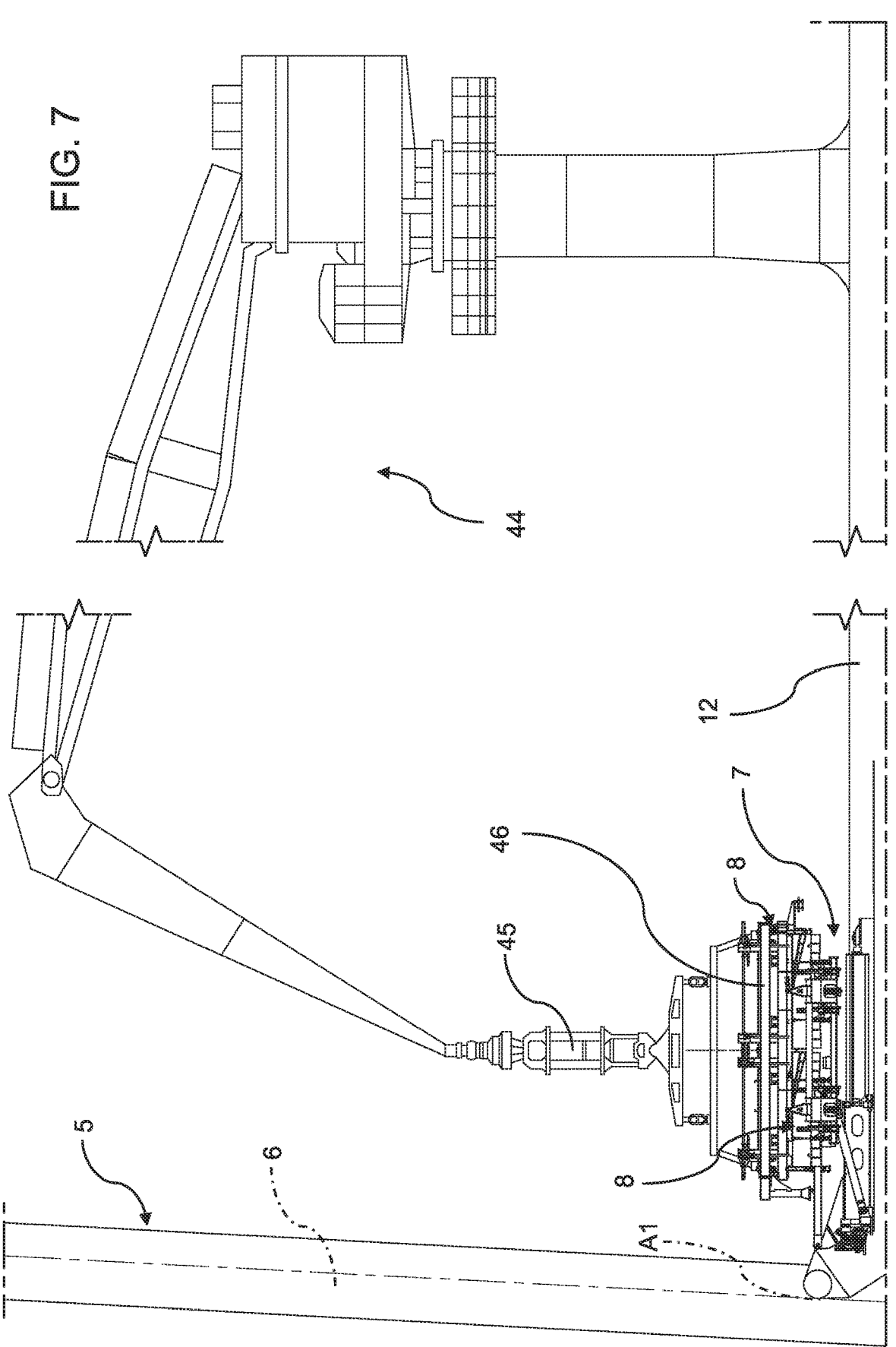
FIGS. 7 to 10 are side elevation views, with schematic parts and parts removed for clarity's sake, of the manipulator device of the laying vessel of FIG. 1 in respective operating configurations.

With reference to FIG. 7, a particular embodiment of the present disclosure is shown, wherein the laying vessel 1 comprises a crane 44 arranged on the open deck 12 and configured to lift the portions 9 of module 8 from the open deck 12 so as to place them on the manipulator device 7.

The crane 44 is equipped with an adjustable gripping tool 45 configured to lift a lifting frame 46, which supports each portion 9 of module 8. In particular, the adjustable gripping tool 45 is configured to adjust the position and/or the inclination of each portion 9 of module 8 with respect to the manipulator device 1 so as to precisely insert each portion 9 of module 8 into the respective jaw 22.

In use and with reference to FIG. 7, the manipulator device 7 is in the loading position on the open deck 12. In such a configuration, the arm 26 is folded over the base body 25, the jaws 22 are in an open position facing upwards, and the portions 9 of module 8 are loaded into the respective housing seats 36 of the jaws 22.

The crane 44 picks up the portions 9 of module 8 from the open deck 12 and places them at the jaws 22 of the manipulator device 7. In such circumstances, the lifting frame 46 is supported at the adjustable gripping tool 45 and in turn supports the portions 9 of module 8. When the portions 9 of module 8 are in proximity to the manipulator device 7, the adjustable gripping tool 45 adjusts the position and the inclination of each portion 9 of module 8 with respect to the manipulator device 1 so as to precisely place each portion 9 of module 8 in the respective jaw 22.

Subsequently, the belts 32 are clamped around the respective portions 9 of module 8 by the clamping devices 37 (FIG. 6).

Figure 8:
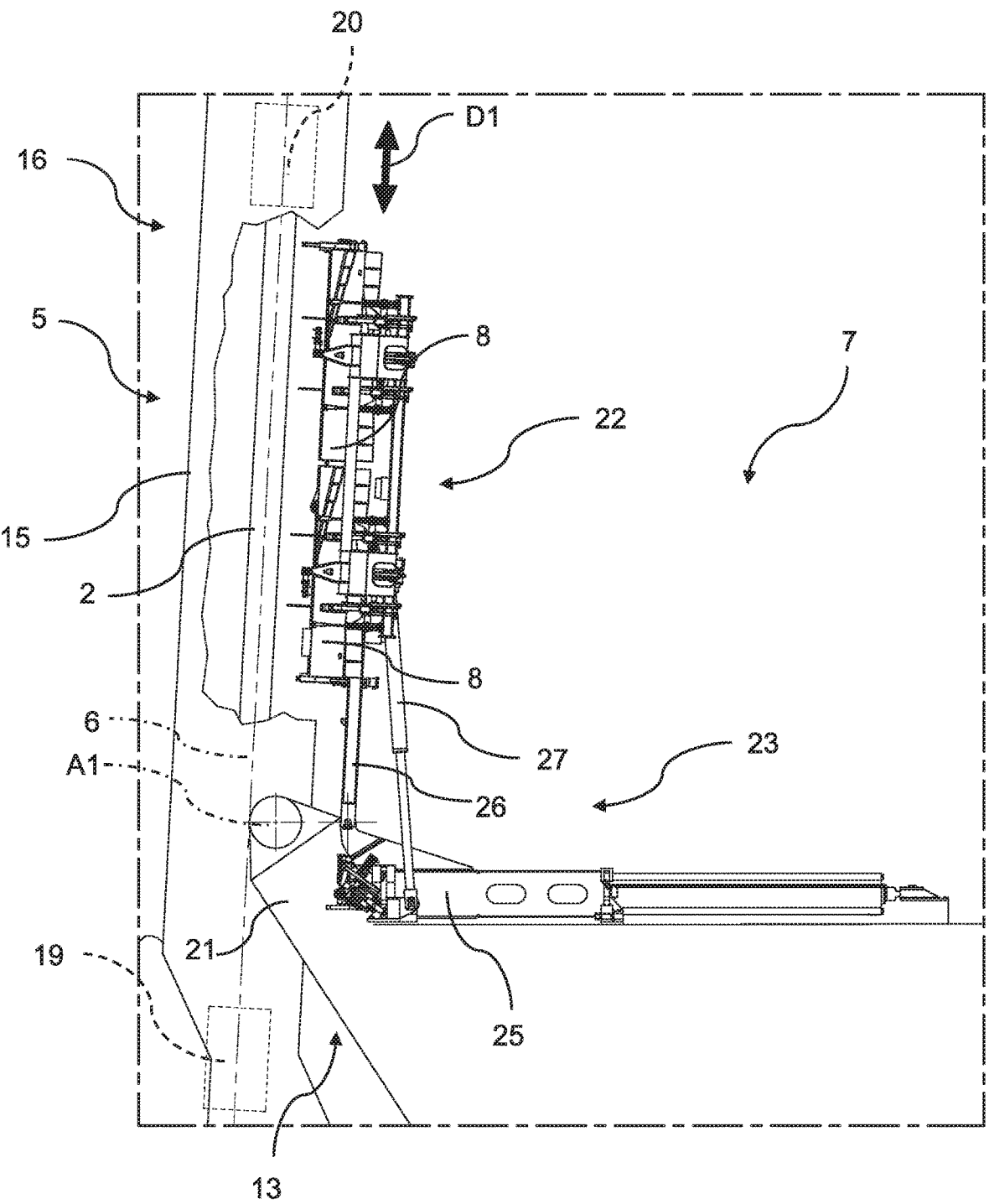

With reference to FIG. 8, the arm 26 is lifted by the actuator 27 to bring the jaws 22 into a vertical position at the pipeline 2 section to which the module 8 is to be applied. The arm 26 is inclined with respect to the open deck 12 so as to align the jaws 22 with the laying line 6, which, in the case described and shown, is substantially vertical.

In accordance with variants of the present disclosure (not shown in the drawings), the laying tower 5, and consequently the laying line 6 may assume different inclinations with respect to the open deck 12. In such configurations, the inclination of the arm 26 is adapted to the inclination of the laying line 6 so as to align the jaws 22 with the pipeline 2 during assembly.

Figure 9:
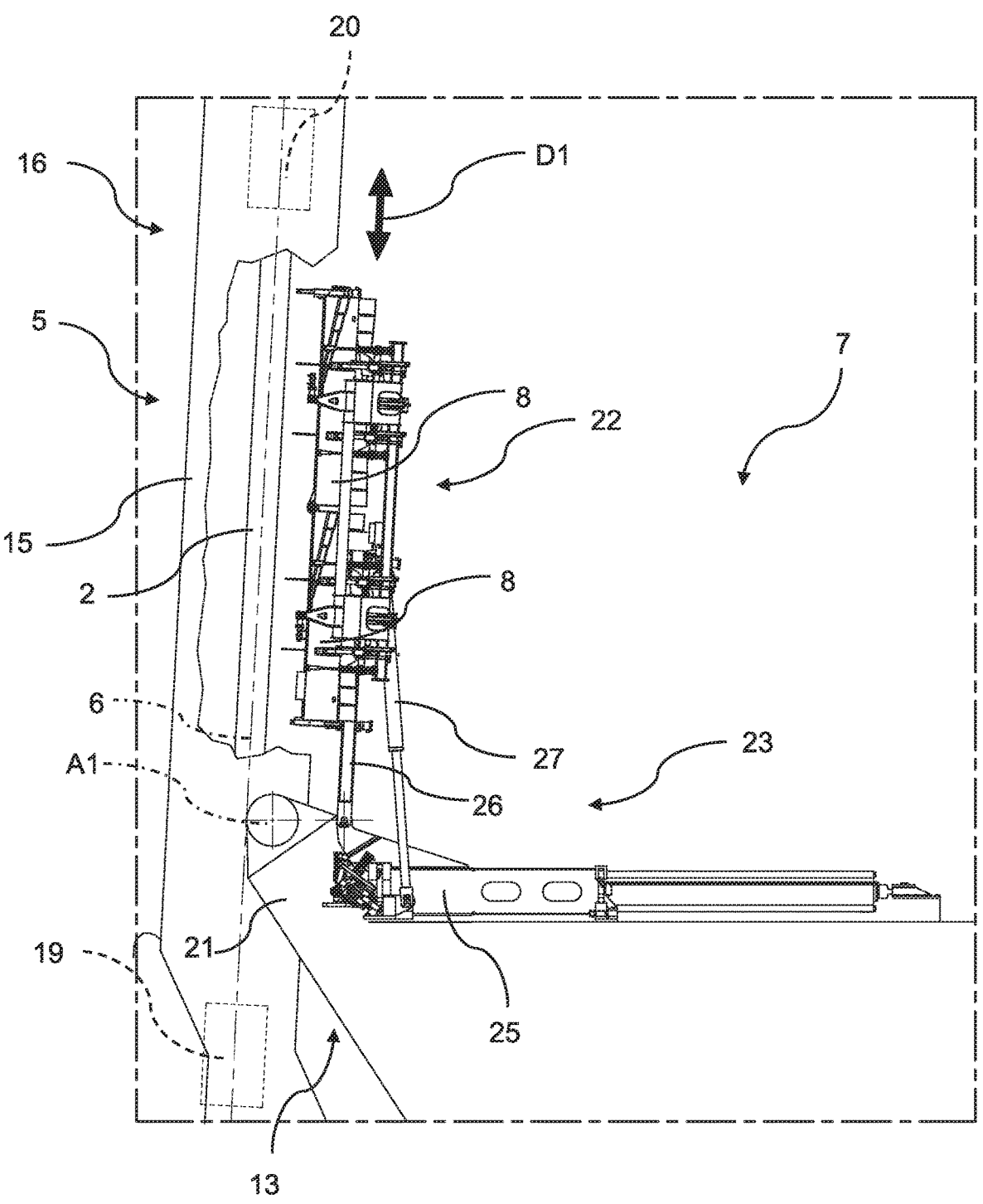

With reference to FIG. 9, the slide 28 (FIGS. 4 to 6) moves the jaws 22 in the direction D1 along the laying line 6 so as to precisely adjust the longitudinal position of the jaws 22 with respect to the pipeline 2 section to which the modules 8 are to be applied.

The adjusting device 41 actuates the actuator 42 to adjust the inclination of the jaws 22 around the rotation axis A5 so as to follow the oscillations of the floating structure 4 and of the laying tower 5.

Figure 10:
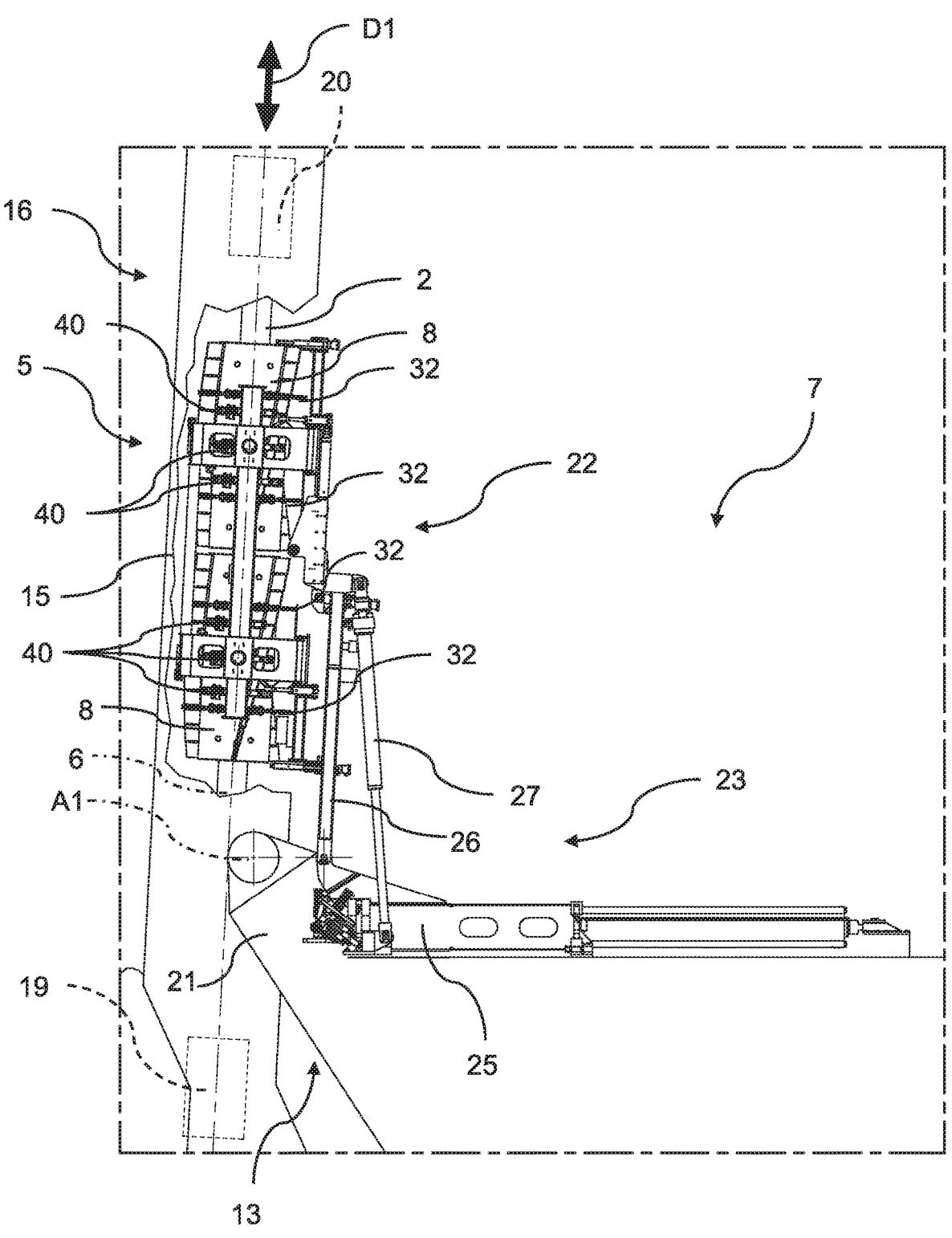

With reference to FIG. 10, the jaws 22 are closed around the pipeline 2 section during assembly. Subsequently, the preloading cylinders 39 (FIG. 4) push the respective portion 9 of module 8 against the pipeline 2 section and the screwdrivers 40 (FIGS. 5 and 6) screw together two respective portions 9 to assemble the module 8 with a set tightening torque. At this point, the preloading cylinders 39 (FIG. 4) release the thrust on the portions 9 and the belts 32 are opened so as to decouple the jaws 22 from the modules 8 to separate the manipulator device 7 from the pipeline 2.

With reference to FIG. 1, once the module 8 has been applied, the clamping unit 19 releases the grip from the pipeline 2 and the clamping unit 20 is moved from the first position to the second position along the laying line 6 to advance the pipeline 2 and lay the pipeline 2 section to which the module 8 has been applied.

In accordance with an embodiment, all the steps of applying the modules 8 to the pipeline 2 and of laying the pipeline 2 described above are carried out in an automated manner without the need for the direct intervention of operators.

Finally, it is evident that variations with respect to the embodiment described can be made to the present disclosure without however departing from the scope of the following claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A manipulator device comprising:

two jaws moveable to an open position and to a closed position, the two jaws configured to respectively house two respective portions of a module configured to enclose a section of a pipeline during assembly of the pipeline; and an articulated mechanism comprising a base body, an arm hinged to the base body and selectively moveable around a first rotation axis, a slide coupled to the arm and the two jaws, and a first elongated body extending along a first longitudinal axis substantially parallel to a first direction, wherein the first elongated body is coupled to the slide and moveably supports the two jaws between the open position and the closed position, the slide is configured to selectively move the two jaws with respect to the arm in the first direction and the articulated mechanism has a plurality of degrees of freedom to place the two jaws: (i) in a loading position, and (ii) in a position that the two jaws are aligned with the pipeline during assembly of the pipeline.

2. The manipulator device of claim 1, wherein the articulated mechanism further comprises an adjusting device configured to adjust, when the two jaws are within a distance from the section of the pipeline, an inclination of the two jaws around a second rotation axis substantially parallel to the first rotation axis.

3. The manipulator device of claim 1, wherein each jaw comprises a frame hinged to the first elongated body around a rotation axis substantially parallel to the first longitudinal axis.

4. The manipulator device of claim 3, wherein the frame of each jaw comprises:

a second elongated body extending along a second longitudinal axis substantially parallel to the first longitudinal axis; and two transverse elements fixed to the second elongated body at a distance from each other, the two transverse elements configured to accommodate the respective portion of the module.

5. The manipulator device of claim 4, wherein each jaw comprises a preloading cylinder coupled to the second elongated body and configured to push the respective portion of the module against the section of the pipeline when the two jaws are in the closed position around the section of the pipeline.

6. The manipulator device of claim 1, wherein each jaw comprises a gripping belt configured to accommodate and selectively hold the respective portion of the module.

7. The manipulator device of claim 1, wherein each jaw comprises an automatic screwdriver configured to screw together the two respective portions of the module.

8. A laying vessel comprising:

a floating structure;

a laying tower hinged to the floating structure around a rotation axis, the laying tower defining a laying line and configured to assemble and lay a pipeline on a bed of a body of water;

a manipulator device comprising:

two jaws moveable to an open position and to a closed position, the two jaws configured to respectively house two respective portions of a module configured to enclose a section of the pipeline during assembly of the pipeline, and an articulated mechanism having a plurality of degrees of freedom to place the two jaws: (i) in a loading position, and (ii) in a position that the two jaws are aligned with the pipeline during assembly of the pipeline, the articulated mechanism comprising a base body, an arm hinged to the base body and selectively moveable around a first rotation axis, a slide coupled to the arm and the two jaws, and a first elongated body extending along a first longitudinal axis substantially parallel to a first direction, wherein the first elongated body is coupled to the slide and moveably supports the two jaws between the open position and the closed position, the slide is configured to selectively move the two jaws with respect to the arm in the first direction.

9. The laying vessel of claim 8, further comprising:

a lifting frame configured to support at least one of the portions of the module; and a crane configured to lift the lifting frame, the crane equipped with an adjustable gripping tool configured to adjust at least one of: (a) a position of the lifting frame with respect to the manipulator device, and (b) an inclination of the lifting frame with respect to the manipulator device, to place each portion of the module in the respective jaw when the two jaws are in the loading position.

10. The laying vessel of claim 8, wherein the laying tower comprises a clamping assembly which is configured to clamp and advance the section of the pipeline and comprises a first clamping unit fixed to the laying tower and a second clamping unit arranged in series with respect to the first clamping unit and moveable along the laying line between a first position at a first distance from the first clamping unit and a second position at a second distance from the first clamping unit, wherein the first distance is greater than the second distance and the manipulator device is configured to apply the two portions of the module around the section of the pipeline between the first clamping unit and the second clamping unit.

11. A method to operate a laying vessel comprising a floating structure and a laying tower hinged to the floating structure around a rotation axis, the laying tower defining a laying line, and configured to assemble and lay a pipeline on a bed of a body of water, the method comprises:

placing, by an articulated mechanism of a manipulator device, two jaws of the manipulator device in a loading position, the two jaws being moveable to an open position and to a closed position, the two jaws configured to respectively house two respective portions of a module configured to enclose a section of the pipeline during assembly of the pipeline;

accommodating a first portion of the module in a first jaw of the two jaws and a second portion of the module in a second jaw of the two jaws;

placing, by the articulated mechanism of the manipulator device, the two jaws in a position that the two jaws are aligned with the pipeline during assembly, the articulated mechanism having a plurality of degrees of freedom and comprising a base body, an arm hinged to the base body and selectively moveable around a first rotation axis, a slide coupled to the arm and the two jaws, and a first elongated body extending along a first longitudinal axis substantially parallel to a first direction, wherein the first elongated body is coupled to the slide and moveably supports the two jaws between the open position and the closed position, the slide is configured to selectively move the two jaws with respect to the arm in the first direction; and closing the two jaws around the section of the pipeline.

12. The method of claim 11, further comprising selectively moving the jaws along the laying line in the first direction.

13. The method of claim 11, further comprising pushing the respective portions of the module against the section of the pipeline.

14. The method of claim 11, further comprising screwing together the first portion of the module and the second portion of the module by an automatic screwdriver.

15. The method of claim 11, further comprising:

lifting, by a crane, at least one of the portions of the module supported by a lifting frame; and adjusting, by an adjustable gripping tool coupled to the crane, at least one of a position of each portion of the module with respect to the manipulator device and an inclination of each portion of the module with respect to the manipulator device.

16. The method of claim 11, further comprising rotating the jaws around another rotation axis.

17. The method of claim 11, further comprising adjusting an inclination of the two jaws around another rotation axis.

18. A method to operate a laying vessel comprising a floating structure and a laying tower hinged to the floating structure around a rotation axis, the laying tower defining a laying line, and configured to assemble and lay a pipeline on a bed of a body of water, the method comprises:

placing, by an articulated mechanism of a manipulator device, two jaws of the manipulator device in a loading position, the two jaws being moveable to an open position and to a closed position, the two jaws configured to respectively house two respective portions of a module configured to enclose a section of the pipeline during assembly of the pipeline;

accommodating a first portion of the module in a first jaw of the two jaws and a second portion of the module in a second jaw of the two jaws;

placing, by the articulated mechanism of the manipulator device, the two jaws in a position that the two jaws are aligned with the pipeline during assembly, the articulated mechanism having a plurality of degrees of freedom and comprising a base body, an arm hinged to the base body and selectively moveable around a first rotation axis, a slide coupled to the arm and the two jaws, and a first elongated body extending along a first longitudinal axis substantially parallel to a first direction, wherein the first elongated body is coupled to the slide and moveably supports the two jaws between the open position and the closed position, the slide is configured to selectively move the two jaws with respect to the arm in the first direction;

closing the two jaws around the section of the pipeline, and adjusting an inclination of the two jaws around another rotation axis.

19. The method of claim 18, further comprising selectively moving the jaws along the laying line in the first direction.

20. The method of claim 18, further comprising pushing the respective portions of the module against the section of the pipeline.

21. The method of claim 18, further comprising screwing together the first portion of the module and the second portion of the module by an automatic screwdriver.

22. The method of claim 18, further comprising:

lifting, by a crane, at least one of the portions of the module supported by a lifting frame; and adjusting, by an adjustable gripping tool coupled to the crane, at least one of a position of each portion of the module with respect to the manipulator device and an inclination of each portion of the module with respect to the manipulator device.

* * * * *